(12) United States Patent
Shih et al.

(10) Patent No.: US 6,201,046 B1
(45) Date of Patent: Mar. 13, 2001

(54) PROCESS FOR MAKING QUATERNIZED VINYLPYRIDINE CARBOXYLATE POLYMERS USING SUSPENSION POLYMERIZATION

(75) Inventors: Jenn S. Shih, Paramus; Eduardo T. Yap, Franklin Lakes; John C. Hornby, Washington Township; Bala Srinivas, Hasbrouck Heights, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/401,112

(22) Filed: Sep. 22, 1999

Related U.S. Application Data

(63) Continuation-in-part of application No. 09/211,909, filed on Dec. 15, 1998, now Pat. No. 6,011,096.

(51) Int. Cl.[7] ................. C08J 3/03; C08K 5/34

(52) U.S. Cl. ............... 524/99; 524/457; 524/458; 524/459; 525/191; 525/205; 525/218; 525/329.4; 525/333.3; 528/310; 528/502 A; 528/503

(58) Field of Search ............... 524/99, 457, 458, 524/459; 525/191, 205, 218, 329.4, 333.3; 528/310, 502 A, 503

(56) References Cited

U.S. PATENT DOCUMENTS 5,776,879 * 7/1998 Shih et al. ............... 510/361

* cited by examiner

*Primary Examiner*—Duc Truong
(74) *Attorney, Agent, or Firm*—Marilyn J. Maue; William J. Davis; Walter Katz

(57) ABSTRACT

This invention relates to the preparation of stable, quaternized vinylpyridine carboxylate homo-, co- and terpolymers in high yield and purity, which polymers are useful as dye transfer inhibitors and polymers complexable with active agrochemical, pharmaceutical or cosmetic agents for controlled release thereof.

6 Claims, No Drawings

PROCESS FOR MAKING QUATERNIZED VINYLPYRIDINE CARBOXYLATE POLYMERS USING SUSPENSION POLYMERIZATION

This application is a CiP of Ser. No. 09/211,909 filed Dec. 15, 1998 now U.S. Pat. No. 6,011,096.

BACKGROUND OF THE INVENTION

1. Field of the Invention

This invention relates to the synthesis of quaternized, dye-complexable vinylpyridine carboxylate mono-, co- and ter- polymers in high yield and purity, employing suspension polymerization and subsequent quaternization of the resulting vinyl pyridine polymer.

2. Description of the Prior Art

Dye completing polymers have been used in laundry detergent and fabric softener compositions to stabilize and minimize leaching of dyes in colored fabrics. During washing of colored and white fabrics, some of the dyes can bleed out of a colored fabric and a portion of the leached dye may deposit on white or lighter colored fabrics. The degree of bleeding is influenced by the character of the dye, the type of cloth and the pH, temperature and mechanical efficiency of the agitation process. Although in some cases the bled dye in the wash liquor can be washed off without altering the color of lighter colored fabrics, the dyed fabric looses a degree of brilliance resulting in a somewhat faded appearance. Often it is found that the fugitive dye deposits either onto the same fabric or onto another fabric leading to patches and streaks in the washed material. This deposition of the bled dye can be inhibited in several ways. One method involves the use of a dye transfer inhibitor (DTI) compound which can complex with the dye and minimize leaching or at least prevent redeposition on the same or other fabrics.

Polyvinylpyrrolidone (PVP), by virtue of its dye complexation ability, has been used to inhibit dye deposition during washing of colored fabrics under laundry conditions. The performance of PVP as a DTI, however, is adversely affected by the presence of anionic surfactants usually present in the washing process.

Vinylpyridine polymers such as those disclosed in U.S. Pat. No. 4,824,910 and in our previous U.S. Pat. Nos. 5,776,879 and 5,929,175, were formerly synthesized in alcoholic media; however, the product of this process contains significantly high unreacted monomer for a given period of reaction time and requires separation of organic solvent to recover pure polymer product. Costly and time consuming treatments are employed to remove impurities with the organic solvent in order to recover a purified product having no objectionable color.

Emulsion polymerization of vinylpyridine prior to quaternization has also been considered; however, this system requires the presence of a surfactant which is objectionable in certain formulations. For example, in cosmetic or pharmaceutical formulations which require specialized wetting agents for the active component, interactions with any remaining amount of surfactant in the polymer product can lead to an undesirable side reaction and/or a discoloration of the formulation. Also, certain dyes are sensitive to and interact with surfactants; thus their presence can cause problems in laundering compositions particularly when used in hot washing and rinsing cycles.

Accordingly, it is an object of this invention to provide a process for the preparation of water stable, quaternized, complexable vinyl pyridine carboxylate polymers which are not subject to the above objections and disadvantages.

Another object is to provide an economical and commercially feasible process for the preparation of a water soluble dye transfer inhibitor and stabilizing component for agrochemical, cosmetic or pharmaceutical formulations which are obtained in high purity suitable for immediate use.

A further feature of the invention is a process for providing a water soluble vinylpyridine polymer containing a quaternary nitrogen and a carboxylate salt in high yield and purity which is free of surfactant.

Another object of the invention is to provide a laundry detergent composition which effectively resists fabric dye transfer or discoloration during the washing and rinsing cycles.

These and many other benefits and advantages of this invention will become apparent from the following description and disclosure.

SUMMARY OF THE INVENTION

This invention is directed to a method for the preparation of a quaternized, water soluble vinyl pyridine carboxylate polymer by an economical and commercially feasible process in high yield and purity. The quaternized polymeric product produced by the present suspension polymerization process can be obtained in water solution or in powder form and contains from about 20 to about 5,000 quaternized units, preferably from 100 to 2,500 units. The quaternized product comprises (a) between about 30 and about 100 wt. % of the quaternized unit having the structure

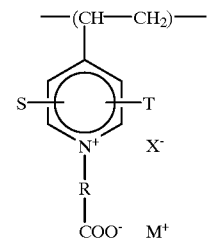

(b) between 0 and about 30 wt. of a non-quaternized poly(vinylpyridine) unit having the structure

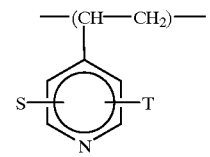

and (c) between 0 and about 70 wt. % of an olefinically unsaturated polymerizable comonomer wherein X is an anion;

M is a cation, preferably an alkali or alkaline earth metal, most preferably sodium or potassium;

R is a divalent hydrocarbon radical selected from the group consisting of a $C_1$ to $C_{12}$ alkylene optionally substituted with monocyclic aryl and S and T are each independently hydrogen or $C_1$ to $C_4$ alkyl.

The above products have a weight average molecular weight of from 5,000 to 1,000,000, preferably from 20,000 to 500,000.

The product polymer, containing a hydrocarbon group interposed between the quaternized nitrogen and the terminal carboxylate salt moiety, results in a polymer having dual functionality for use in a wide variety of applications. Particularly its dye complexing property provides excellent dye transfer inhibition in printing, laundry and rinse formulations for the cleansing or dying of fabrics; whereas its complexability with an active cosmetic, pharmaceutical or agrichemical component provides for gradual and controlled release of the active component.

The comonomers of the above polymers are free radical polymerizable comonomers containing olefinic unsaturation and include, for example, styrene, alkyl styrene, N-vinylpyrrolidone, N-vinyl caprolactam, vinyl imidazole, N-vinyl amide, a lower alkyl acrylate, a lower alkyl methacrylate, acrylamide, methacrylamide and the like and mixtures thereof.

The preferred products of the invention are 75–100% quaternized polymers where, X is a halide, particularly chloride or bromide; M is a metal such as sodium, potassium or calcium; R is $C_1$ to $C_4$ alkylene and S and T are both hydrogen.

The present homo-, co- or ter- polymers are particularly useful at a concentration of from about 2 to about 1,000 ppm in a laundry detergent or rinse, a cosmetic, drug or agrichemical formulation, ink and paint compositions etc. to inhibit the migration of dye or to promote the formation of a complex with an active chemical for controlled release of the active component.

In general, the process for the preparation of the present quaternized vinyl pyridine polymer containing 0 to 70 wt. % comonomer(s) involves charging a 20 to 50 wt. % solids mixture of water and the vinylpyridine monomer, optionally with a desired amount of comonomer to a reactor and adding a water soluble suspension agent and a free radical polymerization initiator while intimately mixing the components under constant agitation and under a blanket of an inert gas, i.e. nitrogen. The mixture is then polymerized at a temperature of between about 70° and about 120° C. The suspension agent and the free radical catalyst each can be introduced in the initial charge or can be added gradually or in increments throughout the reaction. The polymerization is continued until the concentration of vinylpyridine monomer is reduced to a desired concentration, less than 1 wt. % of the reaction mixture, most preferably to less than 0.5 wt. %. In the present process the water suspension containing non-quaternized polymer is an intermediate product which can be recovered as an aqueous suspension or dried to a wet cake or a particulate solid for reconstitution prior to quaternization.

The vinylpyridine homo- or co- polymer is then subjected to quaternization with a suitable metal salt of a halogenated, branched chain or linear, monobasic carboxylic acid optionally substituted with a monocyclic aryl radical. The quaternization is carried out under constant agitation at a temperature of between 40° and about 140° C., optionally under a blanket of inert gas and in the presence of water until the desired degree of quaternization is achieved.

More particularly, in the preferred process, the polymerization of the vinyl pyridine, with or without comonomer, is effected as a suspension in water employing a suspension agent and a free radical initiator at a temperature of between about 60° and about 115° C. The polymerization reaction is described by the equation:

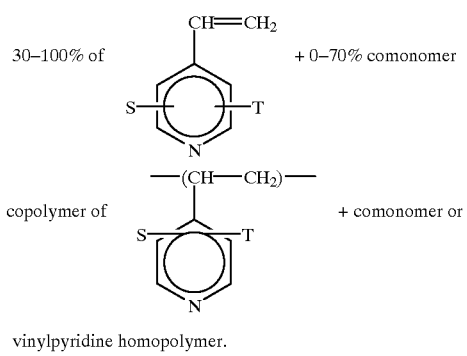

vinylpyridine homopolymer.

The free radical initiator is employed at a concentration of between about 0.1 and about 3 wt. % of the monomer in the mixture. Suitable free radical polymerization initiators include a peroxide, perester, percarbonate, redox initiator and a diazo compound.

Specific examples of free radical polymerization initiators employed in the process include t-butyl peroxy pivalate (LUPERSOL 11); t-amylperoxy pivalate (LUPERSOL 554); t-amyl-(2-ethylhexyl)peroxy carbonate (LUPERSOL TAEC); 1,1-di-(t-amylperoxy)cyclohexane (LUPERSOL 531); azo bis(2-methylbutyronitrile (VAZO 67); azo bis (isovaleronitrile (VAZO 52); azo bis(cyclohexane carbonitrile (VAZO 88) and the like and mixtures of the same. Low temperature initiators include the diacyl peroxides, diesters and azo compounds. High temperature initiators, which may be employed in the final stages of polymerization include 2,5-dimethyl-2,5-di-(t-butyl-peroxy)hexane (LUPERSOL 101); ethyl-2,5-di-(t-butyl-peroxy) hexane; dicumyl peroxide; t-butylcumyl peroxide; t-butylperoxy maleic acid; ethyl-3,3- di(t-butylperoxy) butyrate; di-t-butyl-diperoxy phthalate and the like.

In the above process, the molecular weight of the non-quaternized polymer can be varied according to preference by several methods. For example, lower molecular weights are obtained at the higher temperatures; within the above range, a higher concentration of initiator generally results in lower molecular weight product and the incorporation of a small amount, e.g. 0.5 to 20 wt %, preferably 0.5 to 10 wt %, of chain transfer agent, such as an alkyl thiol, isopropyl alcohol and the like, also provides lower molecular weight polymer.

The water soluble suspension agent of this invention is employed at a concentration of from about 0.75 to about 20 wt %, preferably from about 1 to about 10 wt %, based on monomer. Suitable suspension agents for the product polymer are polymeric and include a poly(vinyl lactam), particularly polyvinyl-pyrrolidone having a K value of 12 to 120, hydroxyethyl cellulose, a polyvinyl alcohol, carboxymethyl cellulose and other inert water soluble types and mixtures thereof. Of these, polyvinylpyrrolidone is preferred.

Initially, in accordance with the preferred process, the vinyl pyridine monomer, in the presence or absence of comonomer, is premixed with the suspension agent and water at ambient temperature under constant agitation and a blanket of inert gas. The resulting mixture is then heated to reaction temperature while the free radical initiator is added continuously or in increments during a 1 to 8 hour reaction period or until, at most, only a trace amount of the non polymerized monomer remains. The resulting non-quaternized intermediate polymer product, suspended in water, is recovered as a stable suspension for subsequent or direct feed to the quaternization zone or the suspension can be dried to particulate form and reconstituted before quaternization.

The suspension containing from about 20 to about 50% solids of non-quaternized vinyl pyridine polymer intermediate is contacted with a mixture of water and an alkali or alkaline earth metal salt of a halogenated $C_1$ to $C_{12}$ monobasic carboxylic acid optionally substituted with a monocyclic aryl radical at a temperature of between about 40° and about 140° C. under vigorous agitation until the quaternization occurs. The concentration of quaternizing agent employed depends on the number of quaternizable nitrogen sites in the polymer and the degree of quaternization desired. Desirably between about 0.5 and about 1.5 moles of quaternizing agent per nitrogen atom in the polymer can be utilized. The resulting polymer product, having quaternized nitrogen and carboxylate metal salt moieties, is suitable for incorporation into a detergent, dye or other formulation without further purification.

Specific examples of halogenated metal carboxylate agents suitable for quaternization of the vinyl pyridine homo- or co- polymer include for example a sodium, potassium or calcium salt of a halogenated $C_2$ to $C_{12}$ monobasic carboxylic acid, such as for example, 3-chloro- or 3-bromo-propionic acid; 4-chloro- or 4-bromo- butyric acid; 2-chloro- or 2-bromo- benzylpropionic acid; 4-chloro- or 4-bromo-3-phenylbutyric acid; 4-chloro- or 4-bromo- methylethyl acetic acid; 5-chloro or 5-bromo valeric acid; 5-chloro- or 5-bromo- methyl valeric acid; 3-chloro- or 3-bromo- capric acid; 8-chloro- or 8-bromo-caprilic acid; 4-chloro- or 4-bromo- 6-tolyl caproic acid; 3-chloro- or 4-bromo- iso-propionic acid and other chlorinated or brominated metal salts of carboxylic acids and mixtures thereof. The quaternizing agents can be employed singly or in an admixture to achieve certain characteristics in the quaternized product.

As an alternative to the above synthesis process, the polymerization and quaternization steps can be reversed where the vinyl pyridine monomer can be initially quaternized and the quaternized monomeric product then polymerized in the presence of a free radical initiator. Since the quaternized product is converted to a water soluble state, the suspension agent in the following polymerization can be eliminated. In this case, the quaternized water soluble monomer having the structure:

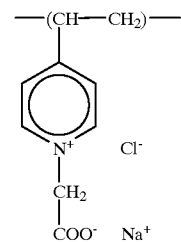

wherein X, M and R are as defined above, is the intermediate product of the process. The following polymerization of the quaternized monomer is carried out in the presence of an above described free radical initiator under operating conditions discussed above. In this operation, the quaternized vinylpyridine monomer feed to the polymerization zone, containing 0 to 30 wt. % quaternized vinylpyridine and 0 to 70 wt. % olefinically unsaturated comonomer, is then polymerized to produce the product of this invention in a high state of purity.

Having generally described the invention, reference is now had to the following examples which illustrate preferred embodiments but which are not to be construed as limiting to the scope of the invention as set forth in the appended claims.

EXAMPLE 1

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinyl-pyrrolidone) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained. Poly(4-vinylpyridine) of molecular weight about 100,000 was recovered as a water suspension of 95 wt. % microparticles of substantially pure poly(4-vinylpyridine). The polymer was dried overnight in an oven and 30 grams of the dried polymer was then contacted with 94.5 grams of water and 33.0 grams of sodium chloro-acetate. The reaction mixture was held at 85° C. for 2 hours under constant agitation and then recovered as the quaternized product of the process having repeating units of

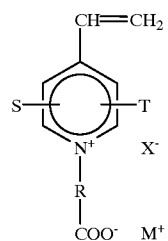

EXAMPLE 2

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of polyvinyl alcohol (98% hydrolysis, MW=10,000–30,000) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxy-pivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained.

The above water suspension was then converted to 40% solids solution by adding 82.5 g. of potassium 2-chloro-butyrate into the kettle. The reaction mixture was held at 85° C. for 10 hours under constant agitation until 90% of the vinyl pyridine polymer was quaternized and then recovered as the quaternized product of the process having repeating units of

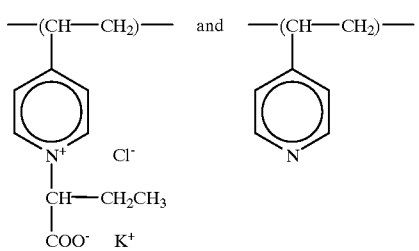

EXAMPLE 3

Into a one liter four-neck resin kettle, fitted with a half-moon teflon blade agitator, a nitrogen purge adapter and a reflux condenser, a mixture of 60 g. of 4-vinylpyridine monomer, 3.0 g. of polyvinyl alcohol (MW 10,000–30,000) and 240 g. of water was charged. The nitrogen purge was begun and continued throughout the experiment. The resulting mixture was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in the kettle was raised to 80° C. after which 0.2 g. of t-butyl peroxypivalate was added every hour until only a trace of unconverted 4-vinyl pyridine monomer remained. Poly(4-vinyl pyridine) of about 200,000 molecular weight was recovered as a wet cake of substantially pure poly(4-vinyl pyridine). The polymer was then dried overnight in an oven and 30 g. of the dried polymer was redispersed in 100 g. of water. To this dispersion was added a solution of 45.9 g. of potassium 2-chloro-2-methyl propionate in 50 g. of water. This mixture was held at 85° C. for 10 hours under constant agitation and then recovered as the quaternized product of the process having repeating units of

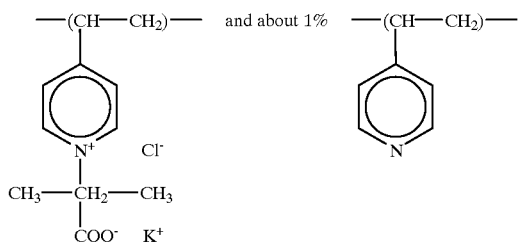

EXAMPLE 4

Into a one liter four-neck resin kettle, fitted with a half-moon teflon blade agitator, a nitrogen purge adapter and a reflux condenser, a mixture of 50 g. of 4-vinyl pyridine monomer, 10.0 g. of N-vinyl pyrrolidone and 240 g. of water was charged. The nitrogen purge eas begun and continued throughout the experiment. The above mixture at ambient temperature was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in the kettle was raised to 80° C.; after which 0.2 g. of tert-butyl peroxypivalate was added every hour until only a trace of vinylpyridine monomer remained. Poly(vinylpyridine/N-vinyl pyrrolidone of about 150,000 was recovered as a wet cake of substantially pure copolymer. The polymer was dried overnight in an oven and 45.0 g. of the dried copolymer was redispersed in 100 g. of water. The dispersion was contacted with 44.0 g. of sodium 2-bromo-propionate and 50 g. of water was added. The mixture was held at 85° C. for 10 hours under constant agitation and then recovered as the product of the process containing units of

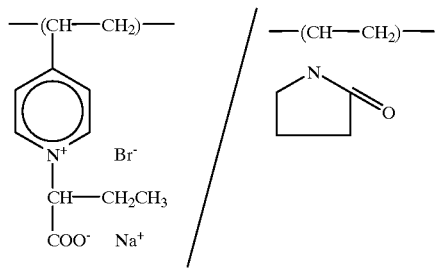

EXAMPLE 5

Into a one liter four-neck resin kettle fitted with a half-moon teflon blade agitator, a nitrogen purge adapter and a reflux condenser, a mixture of 60 g. of 4-vinylpyridine, 65 g. of N-vinyl pyrrolidone and 240 g. of water was charged. The nitrogen purge was started and continued throughout the experiment. The resulting mixture was gradually heated and held at 65° C. for 30 minutes while operating the blade agitator at 350 rpm. An initial charge of 1.0 g. of tert-butyl peroxypivalate was added to the mixture and agitation was continued for one hour. The temperature in the kettle was raised to 80° C. after which 2.0 g. of tert-butyl peroxypivalate was added every hour until only a trace of monomer remained. The resulting copolymer, having a molecular weight of about 300,000, was recovered as a wet cake. The copolymer was dried and 30 g. of the dried product was redispersed in 100 g. of water; after which 17.9 g. of sodium 2-chloro propionate in 50 g. of water was added. This mixture was held at 85° C. for 10 hours under constant agitation and the resulting quaternized poly(vinyl pyridine/N-vinyl pyrrolidone) copolymer was recovered as the product of the process having repeating units of

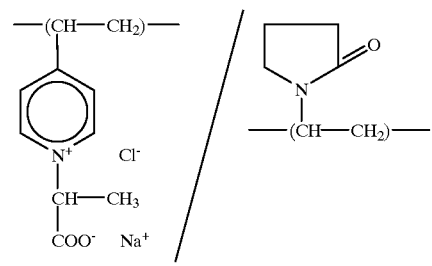

and about 5% of

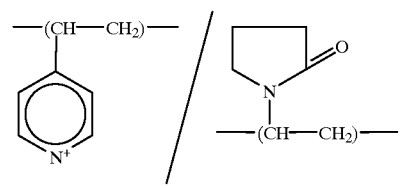

It is to be understood that that the above examples are merely representative and illustrate preferred embodiments and that many modifications and substitutions indicated in the foregoing disclosure can be made therein to provide the superior dye transfer inhibiting, water soluble, complexing properties of the present polymers without departing from the scope of this invention.

What is claimed is:

1. The process which comprises

A. quaternizing with a quaternizing agent selected from the group consisting of a halogenated alkali or alkaline earth metal salt of a branched or linear $C_2$ to $C_{12}$ monobasic carboxylic acid optionally substituted with a monocyclic aryl radical at a temperature of between about 40° C., and about 140° C., an aqueous suspension of a vinyl pyridine homo- or co- polymer containing repeating units of

[A]

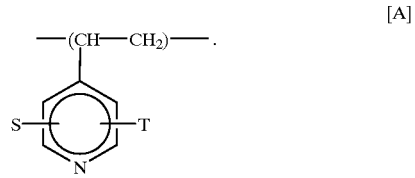

prepared by a water suspension polymerization in the presence of a suspending amount of a suspension agent, a free radical initiator and optionally an olefinically unsaturated comonomer at a temperature of between about 60° and about 120° C. to produce a quaternized polymer containing repeating units of

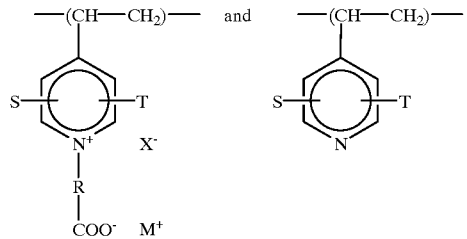

and B.

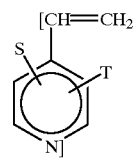

polymerizing the quaternized product of A. in the presence of a free radical initiator and an olefinically unsaturated comonomer at a temperature between about 60° and about 120° C. to provide the polymerized vinyl pyridine polymer containing repeating units of

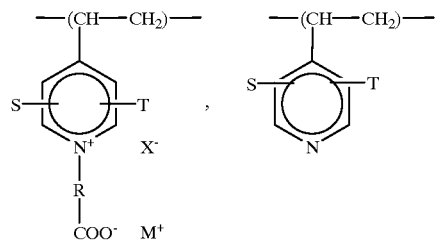

and the monomer units of the olefinically unsaturated comonomer of B. wherein X is halogen; M is an alkali or alkaline earth metal; each of S and T are independently hydrogen or $C_1$ to $C_2$ alky and R is $C_1$ to $C_{11}$ alkylene optionally substituted with monocyclic aryl and recovering the quaternized and subsequently copolymerized product of B.

2. The process of claim 1 wherein the olefinically unsaturated comonomer is selected from the group consisting of styrene, alkyl styrene, N-vinylpyrrolidone, N-vinyl caprolactam, vinyl imidazole, N-vinyl amide, a lower alkyl acrylate, a lower alkyl methacrylate, acrylamide, methacrylamide and the like and mixtures thereof.

3. The process of claim 1 wherein the concentration of the suspension agent is between about 0.75 and about 20 wt. % based on monomer.

4. The process of claim 3 wherein said suspension agent is poly(vinylpyrrolidone).

5. The process of claim 1 wherein the quaternizing agent is a sodium, potassium or calcium salt of a chlorinated or brominated monobasic $C_2$ to $C_8$ carboxylic acid.

6. The process of claim 1 wherein said monocyclic aryl substituent of said carboxylic acid is phenyl.

* * * * *